United States Patent
Kum et al.

(10) Patent No.: US 10,747,555 B2
(45) Date of Patent: Aug. 18, 2020

(54) METHOD AND SYSTEM FOR CONTROLLING USER INTERFACE BASED ON CHARACTERISTICS OF WEARABLE DEVICE

(71) Applicant: Korea Electronics Technology Institute, Seongnam-si, Gyeonggi-do (KR)

(72) Inventors: Seung Woo Kum, Yongin-si (KR); Jae Won Moon, Seoul (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/076,777

(22) PCT Filed: Nov. 13, 2017

(86) PCT No.: PCT/KR2017/012804
§ 371 (c)(1),
(2) Date: Aug. 9, 2018

(87) PCT Pub. No.: WO2019/050086
PCT Pub. Date: Mar. 14, 2019

(65) Prior Publication Data
US 2019/0235885 A1 Aug. 1, 2019

(30) Foreign Application Priority Data
Sep. 8, 2017 (KR) .......................... 10-2017-0115390

(51) Int. Cl.
*G06F 9/451* (2018.01)
*G06F 1/16* (2006.01)
(Continued)

(52) U.S. Cl.
CPC ................ *G06F 9/451* (2018.02); *G06F 1/16* (2013.01); *G06F 1/163* (2013.01); *G06F 1/1698* (2013.01);
(Continued)

(58) Field of Classification Search
CPC ........ G06F 9/451; G06F 1/163; G06F 9/4411; G06F 3/011; G06F 1/16; G06F 3/01; H04M 1/7253
See application file for complete search history.

(56) References Cited

U.S. PATENT DOCUMENTS

2009/0113390 A1* 4/2009 Scholz ................... G06F 9/451
717/120
2010/0081385 A1* 4/2010 Lin ..................... H04M 1/7253
455/41.3
(Continued)

FOREIGN PATENT DOCUMENTS

JP 2011-248855 A 12/2011
JP 2014-151892 A 8/2014
(Continued)

OTHER PUBLICATIONS

International Search Report dated May 28, 2018, issued in corresponding International Application No. PCT/KR2017/012804.
(Continued)

*Primary Examiner* — Matthew Ell
(74) *Attorney, Agent, or Firm* — Hauptman Ham, LLP

(57) ABSTRACT

The present invention relates to technology for controlling a user interface (UI) of a wearable device, and a system for properly controlling a UI based on characteristics of a wearable device according to an embodiment of the present invention which includes a wearable device and a terminal device configured to interwork with each other, wherein the wearable device provides device specification information
(Continued)

when interworking with the terminal device, and the terminal device sets a UI and situation notification method to be controlled in response to a notification situation, based on the device specification information, and uses the set situation notification method to control the set UI in response to the notification situation.

10 Claims, 4 Drawing Sheets

(51) Int. Cl.
*G06F 9/4401* (2018.01)
*H04M 1/725* (2006.01)
*G06F 3/01* (2006.01)
*G06F 3/16* (2006.01)

(52) U.S. Cl.
CPC ............... *G06F 3/01* (2013.01); *G06F 3/011* (2013.01); *G06F 3/016* (2013.01); *G06F 3/16* (2013.01); *G06F 9/4411* (2013.01); *H04M 1/7253* (2013.01)

(56) References Cited

U.S. PATENT DOCUMENTS

| 2014/0244488 | A1 | 8/2014 | Kim et al. |
| 2016/0147713 | A1* | 5/2016 | Ni .................... G06F 16/345 |
| | | | 345/660 |
| 2016/0167578 | A1 | 6/2016 | Park |
| 2018/0310136 | A1* | 10/2018 | Xu .................... G08C 17/02 |

FOREIGN PATENT DOCUMENTS

| KR | 10-2012-0048981 A | 5/2012 |
| KR | 10-2014-0108159 A | 9/2014 |
| KR | 10-2015-0098961 A | 8/2015 |
| KR | 10-1630727 B1 | 6/2016 |

OTHER PUBLICATIONS

Korean Office Action dated Apr. 19, 2019, in connection with counterpart Korean Patent Application No. 10-2017-0115390.
International Search Report dated May 28, 2018, in connection with corresponding International Application No. PCT/KR2017/012804, citing the reference previously filed in the Information Disclosure Statement Aug. 9, 2018.

* cited by examiner

METHOD AND SYSTEM FOR CONTROLLING USER INTERFACE BASED ON CHARACTERISTICS OF WEARABLE DEVICE

CROSS REFERENCE TO RELATED APPLICATION

This present application is a national stage filing under 35 U.S.C § 371 of PCT application number PCT/KR2017/012804 filed on Nov. 13, 2017 which is based upon and claims the benefit of priority to Korean Patent Application No. 10-2017-0115390 filed on Sep. 8, 2017, in the Korean Intellectual Property Office. The disclosures of the above-listed applications are hereby incorporated by reference herein in their entirety.

TECHNICAL FIELD

The present invention relates to technology for controlling a user interface (UI) of a wearable device, and more particularly to a method and system for properly controlling a UI based on characteristics of a wearable device.

BACKGROUND ART

With continuous improvement, wearable devices have been released on the market in various forms, but the wearable devices are different in characteristics of a UI due to the physical limits of the wearable device.

For example, a large-sized wearable device may include a color display, while a small-sized wearable device may have to include a small liquid crystal display (LCD) screen.

Of course, besides, the UI is mounted to the wearable device in consideration of the purposes and characteristics of the UI.

In other words, the wearable devices have different UIs in accordance with the purposes of use and characteristics thereof.

For example, there are the wearable devices such as the Apple Watch, the Samsung Gear, the Nike+, the Fitbit, etc., of which the Apple Watch has a quadrangular display, the Samsung Gear has a circular display, the Nike+ has a light emitting diode (LED) display, the Fitbit has an LCD, and, besides, there are wearable devices that provide a vibration or a sound as the UI but no display.

Like this, the UIs are different according to the wearable devices, and therefore a method (application programming interface: API) of controlling the UI varies depending on the devices, thereby causing a problem that a wearable service developer has to independently develop an API for each device.

For instance, the Apple Watch with the display is capable of giving a notice on a screen, but the Fitbit Force with no display has to use a vibration or an LED flash to give information.

Further, the wearable devices are different in not only the API but also hardware and functions, and therefore a problem arises in that an independent application needs to be additionally developed based on UI characteristics according to devices such as a device with a display, a device with vibration support, a device with sound support, etc.

Therefore, in terms of developments in UIs related to various kinds of wearable devices, a necessary API, a language, and even a use scenario have to be independently developed based on UI modules included in the wearable devices.

DISCLOSURE

Technical Problem

Accordingly, the present invention is conceived to solve the conventional problems as described above, and an object of the present invention is to provide a method and system for properly controlling a UI based on characteristics of a wearable device.

Technical Solution

In accordance with an embodiment of the present invention, there is provided a system for controlling a user interface (UI) based on characteristics of a wearable device, the system including a wearable device and a terminal device configured to interwork with each other, wherein the wearable device provides device specification information when interworking with the terminal device, and the terminal device sets a UI and situation notification method to be controlled in response to a notification situation based on the device specification information and uses the set situation notification method to control the set UI in response to the notification situation.

The device specification information may be stored in the wearable device in an extendible mark-up language (XML) format or a JavaScript object notation (JSON) format.

The wearable device may provide manufacturer information and product information as the device specification information.

The terminal device may compare the received manufacturer information and product information with a UI definition table corresponding to the wearable device, extract a UI and situation notification method to be controlled, and set the extracted UI and situation notification method as a UI and situation notification method to be controlled in response to a notification situation.

The wearable device may provide UI information as the device specification information.

The terminal device may analyze the received UI information, determine a UI and a situation notification method, and set the determined UI and situation notification method as a UI and situation notification method to be controlled in response to a notification situation.

In accordance with another embodiment of the present invention, there is provided a method of controlling a user interface (UI) based on characteristics of a wearable device, the method including: through a wearable device, providing device specification information to a terminal device when the wearable device and the terminal device interwork with each other; through the terminal device, setting a UI and situation notification method to be controlled in response to a notification situation, based on the received device specification information when receiving the device specification information; and through the terminal device, using the set situation notification method to control the set UI in response to the notification situation.

The device specification information may be stored in the wearable device in an extendible mark-up language (XML) format or a JavaScript object notation (JSON) format.

The providing of the device specification information to the terminal device may include providing manufacturer information and product information as the device specification information.

The setting may include comparing the received manufacturer information and product information with a UI definition table corresponding to the wearable device, extracting a UI and situation notification method to be controlled, and setting the extracted UI and situation notification method as a UI and situation notification method to be controlled in response to a notification situation.

The providing of the device specification information to the terminal device may include providing UI information as the device specification information.

The setting may include analyzing the received UI information, determining a UI and a situation notification method, and setting the determined UI and situation notification method as a UI and situation notification method to be controlled in a notification situation.

Advantageous Effects

According to an exemplary embodiment of the present invention, a terminal device can control a UI included in a wearable device based on device specification information from the wearable device.

Therefore, the terminal device can properly control the UI included in the wearable device in accordance with the characteristics of the wearable device.

Further, the terminal device can use a UI definition table corresponding to a device provided by a service server to set a UI and situation notification method to be controlled.

Therefore, when the UI definition table corresponding to the device is simply modified, the terminal device can control various kinds of UI included in various wearable devices.

Thus, there are no needs to independently develop a separate API, a language, a use scenario, etc. for controlling the UI according to the wearable device.

MODES OF THE INVENTION

Figure 1:
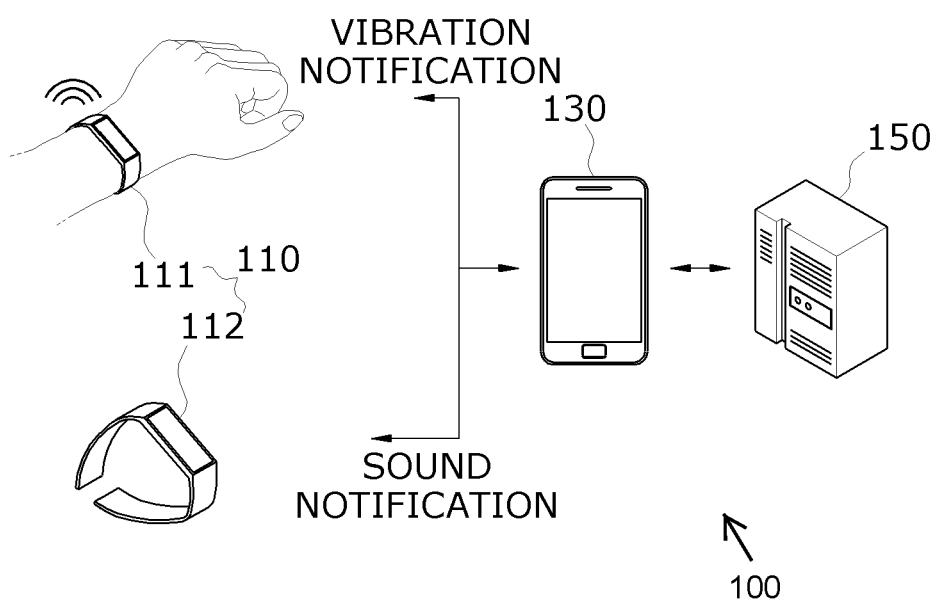
FIG. 1 is a view of illustrating a configuration of a UI control system based on characteristics of a wearable device according to a preferred embodiment of the present invention.

Regarding embodiments of the present invention disclosed in this specification, specific structural to functional descriptions are for illustrative purposes, and these embodiments may be materialized in various forms and should not be construed as limiting the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, when a certain embodiment is alternatively realizable, a function or operation specified in a specific block may be implemented differently from order of a flowchart. For example, two successive blocks may be substantially simultaneously performed in practice, or may be performed in reverse order in accordance with relevant functions or operations.

Below, a UI control method and system based on characteristics of a wearable device according to embodiments of the present invention will be described in detail with reference to the accompanying drawings.

FIG. 1 is a view of illustrating a configuration of a UI control system based on characteristics of a wearable device according to a preferred embodiment of the present invention.

Referring to FIG. 1, a UI control system 100 (hereinafter, referred to as a system) based on characteristics of a wearable device according to a preferred embodiment of the present invention may include a wearable device 110, a terminal device 130 and a service server 150.

In this case, the system 100 includes at least one wearable device 110, and the wearable device 110 may include a UI which is different according to purposes and characteristics.

For example, the UI included in the wearable device 110 may include a display module, a vibration module, an LED module, a sound module, etc. and each UI may be also implemented with various specifications.

For instance, in a case of the display module, a screen shape (e.g., a quadrangle, a circle, etc.), a screen size (e.g., horizontal/vertical pixel numbers), and the number of representable colors (e.g., mono, a gray scale, colors, etc.) may be variously implemented.

Further, in a case of the vibration module, the number of vibration times, a vibration interval, vibration strength, etc. may be variously achieved.

Further, in a case of the LED module, brightness, the number of flashing times, a flashing interval, the kind of colors, etc. may be variously achieved. In a case of the sound module, a volume level, the kind of sound, etc. may be variously achieved.

For the purpose of description, it will be assumed that the system 100 includes two wearable devices 110, in which one wearable device 111 includes a vibration module and the other wearable device 112 includes a sound module.

Under such an assumption, the terminal device 130 controls the vibration module of the wearable device 111 to notify of a situation, and controls the sound module of the wearable device 112 to notify of the situation.

The wearable device 110 may include at least one processor for performing a function, at least one memory for storing an algorithm (or a program) needed for implementing the function and a result from performing an operation, a communication module for communicating with an external device, etc.

In particular, the wearable device 110 stores device specification information, and may transmit the device specification information to the terminal device 130 while interworking with the terminal device 130.

For example, the wearable device 110 may be storing manufacturer information and product information (e.g., a product name) as the device specification information.

Alternatively, the wearable device 110 may be storing UI information (e.g., the kind of UI, situation notification methods according to UIs, etc.) as the device specification information.

That is, the wearable device 110 may be storing the kinds of UI included in the wearable device 110 (e.g., the display module, the vibration module, the LED module, the sound module, etc.) and UI specifications (e.g., a screen configuration, a screen size, the number of representable colors, the number of vibration times, the vibration interval, the vibration strength, the brightness, the number of flashing times, a volume level, etc.).

Further, the device specification information may be stored in the wearable device 110 in various formats, for example, an extendible mark-up language (XML) format, a JavaScript object notation (JSON) format, or similar standardized formats, and may be stored in a scheme format defined as necessary.

Meanwhile, the wearable device 110 may transmit and receive predetermined data through a near field communication (NFC). For example, the wearable device 110 may exchange data with the terminal device 130 through various kinds of NFC, such as Bluetooth communication, radio frequency identification (RFID) communication, Wi-Fi Direct, universal plug and play (UPnP), etc. Further, the wearable device 110 may exchange data with the terminal device 130 through a mobile communication network.

In other words, technology set forth herein does not limit a communication technique between the wearable device 110 and the terminal device 130 to a specific type. For example, the wearable device 110 refers to various devices such as a smart watch, a smart band, etc. However, it will be preferable for the wearable device 110 in the technology set forth herein to have a mechanical structure (a watch type, etc.) which is worn on a user's body.

The terminal device 13 may include at least one processor for implementing a function, at least one memory for storing an algorithm (or a program) needed for implementing the function and a result from performing an operation, a communication module for communicating with an external device, etc.

The terminal device 130 may be, for example, a smart phone, as an element that is connected to and exchanges data with the wearable device 110.

In particular, when the terminal device 130 interworks with the wearable device 110, the terminal device 130 may receive the device specification information from the wearable device 110.

The terminal device 130 may receive the device specification information by making a request for the device specification information to the wearable device 110, or may automatically receive the device specification information by interworking with the wearable device 110.

The terminal device 130 may receive the manufacturer information and the product information (e.g., a product name) as the device specification information.

In this case, when the terminal device 130 receives the UI information (e.g., the kind of UI, situation notification methods according to UIs, etc.) as the device specification information, the terminal device 130 analyzes the received UI information to determine a UI and a situation notification method, and the terminal deice 130 controls the UI in accordance with the situation notification method.

Meanwhile, the terminal device 130 may receive the UI information (e.g., the kind of UI, situation notification methods according to UIs, etc.) as the device specification information, Further, the terminal device 130 may be storing UI definition tables corresponding to devices.

Here, the UI definition table corresponding to the device refers to a table in which the kind of UI included in the wearable device 110 and the situation notification methods according to the UIs are tabulated corresponding to the wearable device 110.

The UI definition table corresponding to the device is not limited to one type, and may be defined as various types.

For example, the UI definition table corresponding to the device may be tabulated in such a manner that the kind of UI and the situation notification methods according to the UIs are defined based on the manufacturer information and the product information about the wearable device 110.

Therefore, when the terminal device 130 receives the manufacturer information and the product information from the wearable device 130, the terminal device 130 compares the manufacturer information and the product information with those in the UI definition table corresponding to the device and determines what kind of UI the wearable device 130 has, and how to control the UI to notify of a situation.

Further, the terminal device 130 may receive the UI definition table corresponding to the device from the service server 150.

The following table 1 shows an example of the UI definition table in which UIs included in a certain wearable device and situation notification methods defined according to the UIs are tabulated.

TABLE 1

|  | Phone call | Message | SNS notification | Exercise achievement |
|---|---|---|---|---|
| Display module | Text box | Text box | Text box | Text box |

TABLE 1-continued

|  | Phone call | Message | SNS notification | Exercise achievement |
|---|---|---|---|---|
| Vibration module | Repeat long vibration | Short vibration 3 times | Short vibration 5 times | Repeat long/short vibration |
| LED module | Yellow flash | Red flash | Blue light | Green flash for 3 seconds |
| Sound module | Ring | Message text to speech (TTS) | SNS TTS | Guide TTS |

Meanwhile, the service server 150 provides a service, stores a UI definition table corresponding to a device, and transmits the UI definition table, which corresponds to the device, to the terminal device 130.

To this end, the service server 150 may include at least one processor for implementing a function, at least one memory for storing an algorithm (or a program) needed for implementing the function and a result from performing an operation, a communication module for communicating with an external device, etc.

In the foregoing descriptions, the elements of the UI control system based on the characteristics of the wearable device according to a preferred embodiment of the present invention and the functions of the elements are described. Below, a UI control method based on the characteristics of the wearable device according to a preferred embodiment of the present invention will be described in detail.

Figure 2:
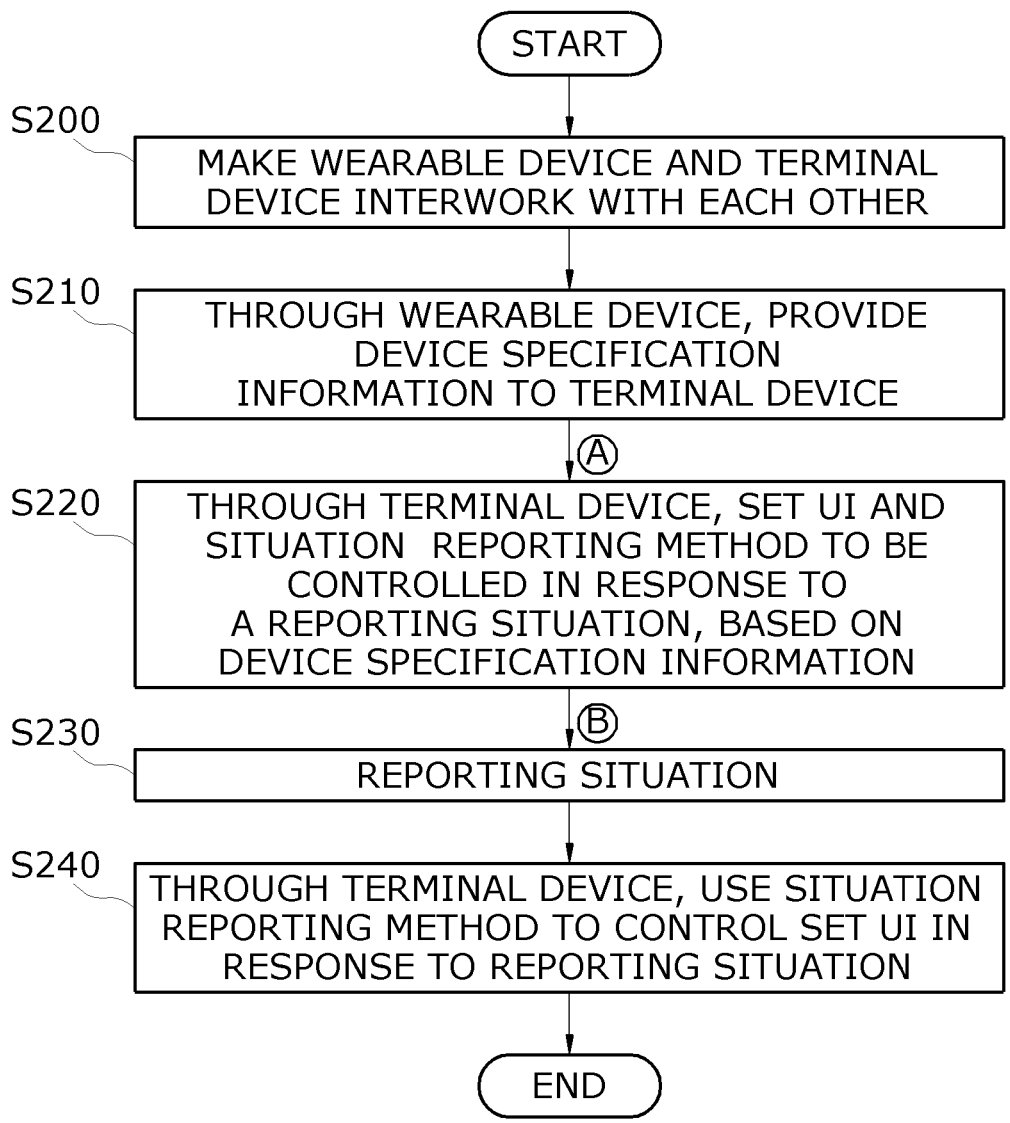
FIG. 2 is a flowchart for illustrating a UI control method based on characteristics of a wearable device according to a preferred embodiment of the present invention.

FIG. 2 is a flowchart for describing a UI control method based on characteristics of a wearable device according to a preferred embodiment of the present invention.

The operations shown in FIG. 2 may be achieved by the system 100 shown in FIG. 1, on the assumption that the service server 150 transmits a UI definition table corresponding to a device to the terminal device 130, and the terminal device 130 stores the UI definition table corresponding to the device.

For example, the device specification information may be stored in the XML format, the JSON format, or similar standardized formats.

First, when the wearable device 110 and the terminal device 130 interwork with each other (S200), the wearable device 110 transmits the stored device specification information to the terminal device 130 (S210).

In this case, the wearable device 110 may transmit the device specification information in response to a request of the terminal device 130, or may automatically transmit the device specification information when interworking with the terminal device 130.

Further, the wearable device 110 may transmit the manufacturer information and the product information (e.g., a product name) as the device specification information.

Alternatively, the wearable device 110 may transmit the UI information (e.g., the kind of UI, situation notification methods according to UIs, etc.) as the device specification information.

When the terminal device 130 receives the device specification information in the operation S210, the terminal device 130 uses the received device specification information to set the UI and situation notification method to be controlled in response to a notification situation (S220).

After the operation S220, when the terminal device 130 is in the notification situation (S230), the terminal device 130 uses the set situation notification method to control the set UI (S240), thereby allowing a user to know of the situation through the wearable device 110.

Figure 3:
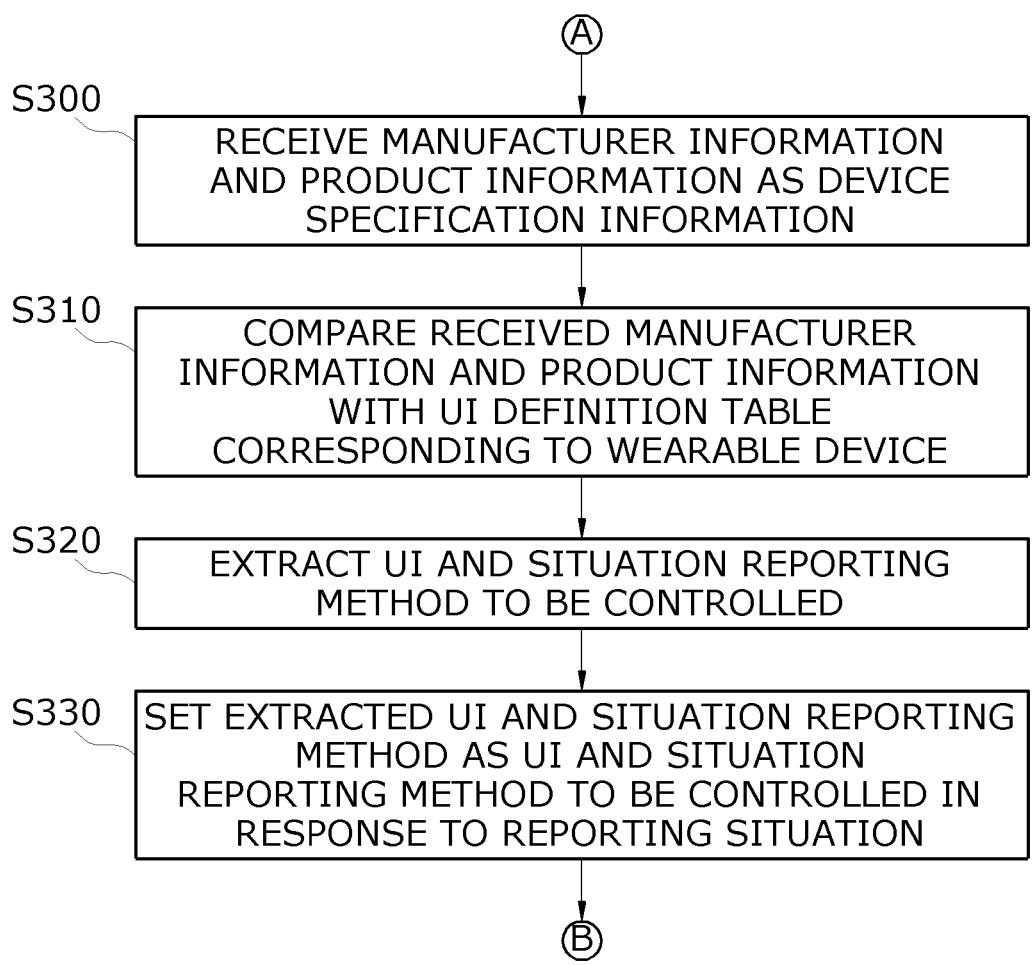
FIG. 3 is a flowchart of a first example for more concretely describing an operation S220 in the UI control method of FIG. 2.

FIG. 3 is a flowchart of a first example for more concretely describing the operation S220 in the UI control method of FIG. 2.

The flow of FIG. 3 shows a case where the manufacturer information and the product information are provided as the device specification information.

When the terminal device 130 receives the manufacturer information and the product information as the device specification information (S300), the terminal device 130 compares the received manufacturer information and product information with those in the UI definition table corresponding to the device (S310), extracts a UI and situation notification method to be controlled (S320), and sets the extracted UI and situation notification method as the UI and situation notification method to be controlled in response to a notification situation (S330).

Figure 4:
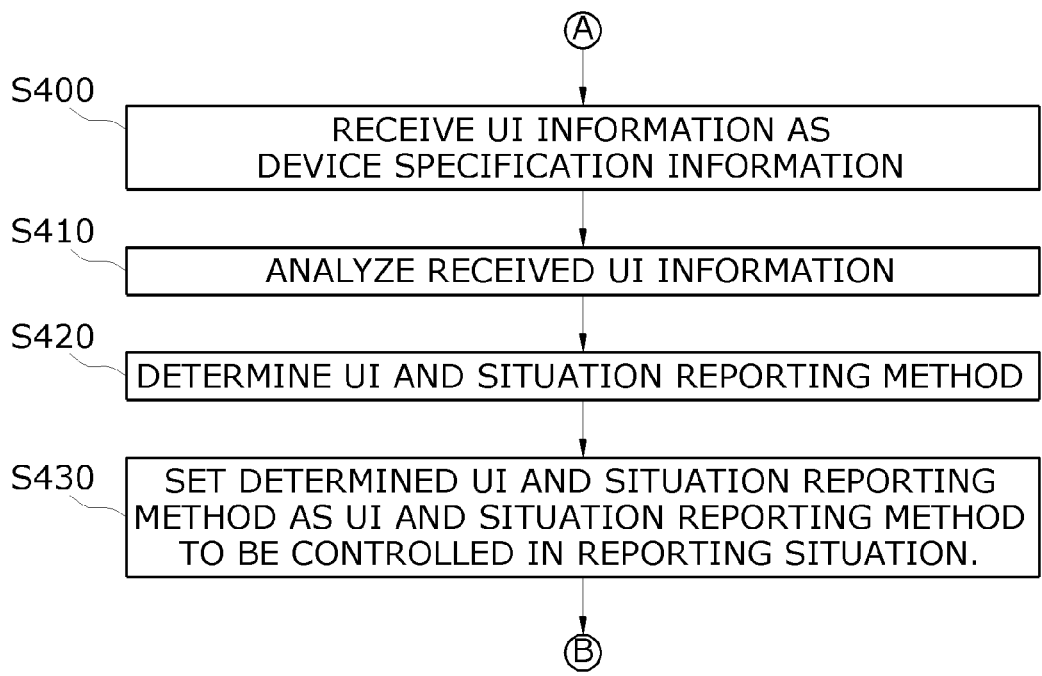
FIG. 4 is a flowchart of a second example for more concretely describing the operation S220 in the UI control method of FIG. 2.

FIG. 4 is a flowchart of a second example for more concretely describing the operation S220 in the UI control method of FIG. 2.

The operations of FIG. 4 show a case where the UI information is provided as the device specification information.

When the terminal device 130 receives the UI information (e.g., the kind of UI, situation notification methods according to UIs, etc.) as the device specification information (S400), the terminal device 130 analyzes the received UI information (S410), determines the UI and the situation notification method (S420), and sets the determined UI and situation notification method as the UI and situation notification method to be controlled in response to a notification situation (S430).

Although all elements described in above embodiments are combined into one or operate as they are combined, the present invention is not limited to these embodiments. In other words, one or more elements among all of them may be selectively combined and operate without departing from the scope of the present invention. Further, all the elements may be respectively materialized as single independent hardware components, but some or all of them may be selectively combined and materialized as a computer program having a program module to perform some or all functions combined in a single hardware component or a plurality of hardware components. Such a computer program may be stored in computer readable media such as a universal serial bus (USB) memory, a compact disc (CD), a flash memory, etc., and read and executed by a computer, thereby materializing the embodiments. The medium for storing the computer program may include a magnetic recording medium, an optical recording medium, a carrier wave medium, etc.

Although the embodiments of the UI control method and system based on the characteristics of the wearable device according to the present invention have been described, the scope of the present invention is not limited to a specific embodiment, and various alternatives, modifications and changes can be made as long as they are obvious to a person having an ordinary skill in the art to which the present invention pertains.

Therefore, the embodiments and accompanying drawings of the present invention are not intended to limit the spirit of the present invention but for illustrative purposes, and the scope of the present invention is not restricted by the embodiments and accompanying drawings of the present invention. The scope of the present invention is defined by the appended claims, and all the spirits of the equivalent scope must be construed as falling within the scope of the present invention.

The invention claimed is:

1. A system for controlling a user interface (UI) based on characteristics of a wearable device, the system comprising:
a wearable device and a terminal device configured to interwork with each other,
wherein:
the wearable device is configured to provide device specification information to the terminal device when interworking with the terminal device, the device specification information including different kinds of UI information, and situation notification methods corresponding to the different kinds of UI information, and
the terminal device is configured to
set a UI and situation notification method to be controlled in response to a notification situation, based on the different kinds of UI information and the corresponding situation notification methods of the device specification information, and
use the set situation notification method to control the set UI in response to the notification situation; and
wherein the different kinds of UI information include a display module, a vibration module, a LED module, and a sound module, each of which has a corresponding situation notification method among the situation notification methods.

2. The system according to claim 1, wherein the device specification information is stored in the wearable device in an extendible mark-up language (XML) format or a JavaScript object notation (JSON) format.

3. The system according to claim 1, wherein the wearable device is configured to further provide manufacturer information and product information as the device specification information.

4. The system according to claim 3, wherein the terminal device is configured to
compare the received manufacturer information and product information with a UI definition table corresponding to the wearable device, the UI definition table including the different kinds of UI information and the corresponding situation notification methods,
extract a UI and situation notification method to be controlled, and
set the extracted UI and situation notification method as the UI and situation notification method to be controlled in response to the notification situation.

5. The system according to claim 1, wherein the terminal device is configured to
analyze the received different kinds of UI information,
determine a UI and situation notification method, and
set the determined UI and situation notification method as the UI and situation notification method to be controlled in response to the notification situation.

6. A method of controlling a user interface (UI) based on characteristics of a wearable device, the method comprising:
through a wearable device, providing device specification information to a terminal device when the wearable device and the terminal device interwork with each other, the device specification information including different kinds of UI information, and situation notification methods corresponding to the different kinds of UI information;
through the terminal device, setting a UI and situation notification method to be controlled in response to a notification situation, based on the received different kinds of UI information and situation notification methods of the device specification information when receiving the device specification information; and
through the terminal device, using the set situation notification method to control the set UI in response to the notification situation,
wherein the different kinds of UI information include a display module, a vibration module, a LED module, and a sound module, each of which has a corresponding situation notification method among the situation notification methods.

7. The method according to claim 6, wherein the device specification information is stored in the wearable device in an extendible mark-up language (XML) format or a JavaScript object notation (JSON) format.

8. The method according to claim 6, wherein the providing of the device specification information to the terminal device further comprises providing manufacturer information and product information as the device specification information.

9. The method according to claim 8, wherein the setting comprises
comparing the received manufacturer information and product information with a UI definition table corresponding to the wearable device, the UI definition table including the different kinds of UI information and the corresponding situation notification methods,
extracting a UI and situation notification method to be controlled, and
setting the extracted UI and situation notification method as the UI and situation notification method to be controlled in response to the notification situation.

10. The method according to claim 6, wherein the setting comprises
analyzing the received different kinds of UI information,
determining a UI and a situation notification method, and
setting the determined UI and situation notification method as the UI and situation notification method to be controlled in the notification situation.

* * * * *